Patented Aug. 4, 1942

2,292,208

UNITED STATES PATENT OFFICE 2,292,208

COMPOSITION OF MATTER AND PROCESS FOR PREVENTING WATER-IN-OIL TYPE EMULSIONS RESULTING FROM ACIDIZATION OF CALCAREOUS OIL-BEARING STRATA

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Application May 12, 1941, Serial No. 393,129

9 Claims. (Cl. 252—8.55)

This invention relates to the art or procedure commonly referred to as acidization of oil-bearing calcareous strata or the like, and which consists in introducing a strong mineral acid into an oil well for the purpose of causing the acid to disintegrate, dissolve, or re-act with the calcareous oil-bearing structure of the well, in a manner that results in an increase in the amount of crude petroleum obtained from the oil-bearing strata.

The main object of our invention is to prevent water-in-oil type emulsions resulting from such acidization procedure, our present application being a continuation in part, of our co-pending application Serial No. 342,716, filed June 27, 1940, now Patent No. 2,262,357, dated November 11, 1941.

Many oil wells, after being subjected to acidization, produce emulsions, frequently of a very refractory nature, that have to be demulsified or subjected to chemical, electrical, or similar treatment, in order to recover the oil or valuable constituent of the emulsion. We have devised a process or procedure by which the oil-bearing calcareous structure of a well can be acidized to increase the oil production, without danger of the procedure causing the well to produce a product, which, after being discharged from the well, has to be treated with a demulsifying agent, or subjected to other treatment of the kind commonly employed for converting refractory petroleum emulsions into oil that can be sold to pipe lines and refineries. Such refractory emulsions which often follow conventional acidization, represent a transitory, rather than a permanent situation, but even if lasting only for a few weeks, are extremely objectionable.

Another object of our invention is to provide a new composition of matter that is particularly adapted for use in the operation of acidizing the calcareous oil-bearing strata of a well, inasmuch as said composition will re-act with or act upon the calcareous structure in a way to increase the amount of crude petroleum obtainable from said structure, without, however, converting said crude petroleum into an objectionable emulsion.

Our new process or procedure, briefly stated, consists in causing an emulsion-preventing agent of the kind hereinafter described, to be mixed with, dissolved in, or commingled with the fluids, liquids, or liquid mixture in an oil well that has been subjected to, or which is being subjected to, acidization prior to emergence of said fluids, liquids, or liquid mixtures from the well. Said emulsion-preventing agent consists of oxyalkyl derivatives of imidazolines. These types of materials and the method of preparing the same are well known. For instance, see U. S. Patent No. 2,211,001, dated August 13, 1940, to Chwala.

In addition to our aforementioned co-pending application Serial No. 342,716, attention is directed to our co-pending application Serial No. 393,128, filed May 12, 1941, that resulted in U. S. Patent No. 2,262,743, dated November 11, 1941, which is concerned with the use of oxyalkyl derivatives of imidazolines broadly, for breaking petroleum emulsions.

In our aforementioned co-pending application Serial No. 342,716, which is concerned with various chemical compounds adapted for use in breaking oil field emulsions, reference was made to a type exemplified by the following formula:

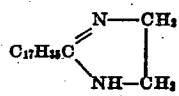

In regard to such compounds, it is pointed out in said co-pending application Serial No. 342,716, that the oxyalkylated derivatives may be employed. This fact is stated in the following language:

"Also, as is well known, any of the diamines of the kind previously described containing at least one amino hydrogen atom may be converted into hydroxylated derivatives by reaction with an alkylene oxide, such as ethylene oxide, propylene oxide, glycidol, epichlorhydrin, and the like. As to the general procedure employed, although not concerned particularly with cyclic amines or the like, reference is made to U. S. Patent No. 2,046,720, dated July 7, 1936, to Bottoms.

"The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification."

The compounds herein contemplated are characterized by the presence of a five-membered heterocyclic ring with two atoms different from carbon. More specifically, they may be considered as derivatives of imidazole, frequently referred to as glyoxaline. Imidazole (glyoxaline) is indicated by the following formula:

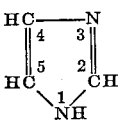

The imidazolines or glyoxalidines may be considered as dihydro-derivatives of amidazole (glyoxaline); and thus the expressions "dihydroglyoxalines" and "glyoxalidines" are often employed. The introduction of two hydrogen atoms at the 4–5 position results in the conversion of imidazole into dihydroglyoxaline, which may be indicated by the following formula:

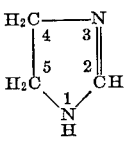

As to the manufacture of imidazolines, reference is made to the following patents: U. S. Patents Nos. 2,215,861, 2,215,862, 2,215,863, and 2,215,864, dated September 24, 1940, to Waldman and Chwala.

Imidazolines or glyoxalidines may be regarded as dehydration products of certain amides; and they may be obtained by reacting polyamines and the higher carboxylic acids under certain conditions. The formation of these glyoxalidine compounds, while forming no part of the present invention, is indicated by the following scheme:

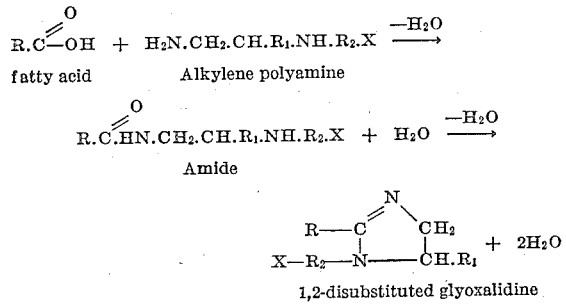

wherein R represents an alkyl or alkenyl group containing from 10 to 20 carbon atoms (the residue of a higher fatty acid); $R_1$ represents hydrogen or a lower alkyl group; $R_2$ represents an alkylene group, or a lower alkyl substituted alkylene group; and X represents a hydroxyl group, an amino group or an amino-alkylene substituted imino group. See U. S. Patent No. 2,214,152, dated September 10, 1940, to Wilkes.

See also U. S. Patents Nos. 2,155,877 and 2,155,878, both dated April 25, 1939, to Waldmann and Chwala.

The expression "higher molecular weight carboxy acids" is an expression frequently employed to refer to certain organic acids, particularly monocarboxy acids, having more than six carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetylricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as these mentioned; hydroxy and alpha-hydroxy higher carboxylic, aliphatic and fatty acids, such as hydroxystearic acid, dihydroxypalmitic acid, dihydroxystearic acid, dihydroxybehenic acid, alpha-hydroxy capric acid, alphahydroxy stearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy-diphenyl, naphthenic, and abietic acid; aralkyl and aromatic acids, such as hexahydrobenzoic acid, hydrogenated naphthoic, hydrogenated poly-carboxy-diphenyl, naphthenic, and abietic acid; aralkyl and aromatic acids, such as benzoic acid, Twitchell fatty acids, naphthoic acid, carboxy-diphenyl, pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, chloro-, keto-, and amino-derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect, except in altering the hydrophile-hydrophone balance.

One may also employ the blown or oxidized acids, such as blown ricinoleic acid, blown oleic, etc., or estolides derived from blown oils, such as blown castor oil, blown soyabean oil, etc.

Needless to say, the acids themselves need not be employed; but one may readily employ any functional equivalent, such as the anhydride, the acyl chloride, or the like. In some instances, the esters, especially in the presence of a trace or a significant amount of water, act as the acid itself, in that the acid is liberated. Unless specific reference is made to a particular isomer, one may employ any isomer or mixture of various isomers, if the acid or acids are so available. We have produced emulsion-preventing agents or compounds suitable for use in practising our process, by the following procedures:

Example 1

1-aminoethyl-2-heptadecenyl glyoxalidine is prepared by mixing one gram mole (282 grams) of oleic acid with two gram moles (206 grams) of diethylene triamine, and heating the mixture for a period of about 16 hours under a distilling column. Water was continuously removed until a temperature of about 245° C. was reached. The quantity of water thus removed amounted to about 1.7 moles. Unreacted diethylene triamine was distilled from the reaction mixture under vacuum, and the residue then was purified by distillation at an absolute pressure of 1 mm. of mercury, at which point it boiled within a temperature range of 225° to 250° C. About 220 grams of the 1-aminoethyl-2-heptadecenyl glyoxalidine was obtained as a pale yellow liquid. The product also may be designated, by reference to the reactants used in its preparation, as oleyl diethylene triamine.

Ethylene oxide is introduced into the above base at a temperature of about 120–140° C., until the increase in weight amounts to about 2½ pound moles of ethylene oxide calculated upon one pound mole of the base.

Example 2

The base used in the preceding example is replaced by 1-(aminoethyl ethylamino)-2-heptadecenyl glyoxalidine. This glyoxalidine was prepared by reacting 1 gram mole of oleic acid with three gram moles (438 grams) of triethylene tetramine in a vessel equipped with a distilling column. The mixture was heated for a period of about six hours, and water was continuously removed until a temperature of about 300° C. was reached. Approximately 1.9 moles of water were thus removed. The reaction mixture was then distilled under vacuum to remove excess triethylene tetramine.

Example 3

Tetraethylenepentamine is substituted for triethylene tetramine as a reactant in the preceding example. The glyoxalidine obtained was treated as before with ethylene oxide.

Example 4

Lauric acid is substituted as a reactant for oleic acid in the three preceding examples.

Example 5

Ricinoleic acid is substituted for oleic acid in Examples 1–3 preceding.

Example 6

Naphthenic acid is substituted for oleic acid in Examples 1–3 preceding.

Example 7

An equivalent molal amount of propylene oxide is substituted for ethylene oxide in Examples 1–6 preceding.

The preferred type of demulsifier is obtained by the action of 2–10 moles of the oxyalkylating agent, for instance, ethylene oxide or propylene oxide, in one mole of the imidazoline.

In the hereto appended claims, the addition products formed by reaction with acids or the basic form by reaction with water, is included within the scope of the claims. Similarly, where the claims specify the presence of the group:

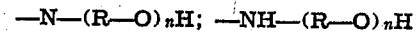

$$-\text{N}-(\text{R}-\text{O})_n\text{H}; \quad -\text{NH}-(\text{R}-\text{O})_n\text{H}$$

i. e., the group introduced by oxyalkylation at the amino hydrogen position, it is understood that R includes groups derived from glycid or the like.

It is to be noted that the compounds herein contemplated, being basic in character, may be used as such, or in the form of a base, i. e., in combination with water, or in the form of a salt, i. e., in combination with an organic or inorganic acid, such as hydrochloric acid, acetic acid, lactic acid, and the like.

In practising our process, the said emulsion-preventing agent is caused to act upon or come in contact with the fluids, liquids, or liquid mixture in a well that has been subjected to acidization, either while said fluids or liquids are at the bottom of the well, or while said fluids or liquids are traveling upwardly to the surface of the ground, but the particular procedure, the means used to effect the mixing or commingling of said emulsion-preventing agent with the well fluids or liquids, and the particular time when said mixing is effected, are immaterial, so long as said emulsion-preventing agent becomes mixed with, dissolved in, or commingled with the cognate fluids of the well, or the liquids or liquid mixture resulting from the acidization operation (the oil and the reaction product of the mineral acid on the calcareous structure) prior to emergence from the well. Equally good results may be obtained by the following procedure, to wit:

(a) Introducing the emulsion - preventing agent, preferably in aqueous solution, prior to the introduction of the mineral acid into the well;

(b) Introducing the emulsion - preventing agent along with the mineral acid, i. e., dissolved in said acid; and (c) Introducing the emulsion - preventing agent, preferably in aqueous solution, immediately after the introduction of the mineral acid.

The composition of matter that we have devised for acidizing the calcareous oil-bearing structure of oil wells, consists of the emulsion-preventing agent above described, mixed with, dissolved in, or combined with a strong mineral acid, such as hydrochloric acid, nitric acid, sulfuric acid, sulfamic acid, or mixtures of the same. Our preference is to use hydrochloric acid, whose concentration is at least equal to approximately half strength commercial 18° Bé. acid, as we have found that when such an acid is mixed with approximately 0.01% to 2.5% of the herein contemplated emulsion-preventing agent or agents, one obtains a new composition of matter that is perfectly stable and homogeneous, and which exhibits unusual properties, particularly when said acid mixture or new composition of matter is employed in the acidization of oil-bearing strata. However, we wish it to be understood that our invention, i. e., the new process and composition of matter herein described, is not restricted to the use of hydrochloric acid, but instead, contemplates the use of our suitable "strong mineral acid," several of which have previously been described as being usable in place of hydrochloric acid. Similarly, we wish it to be understood that the new composition of matter herein described may have other or additional uses, such, for example, as in the acidization of oil-bearing strata which do not produce emulsions. The hydrochloric acid or the like that is employed may or may not have present other addition agents intended to make the acid particularly adapted to meet localized conditions which sometimes arise in the course of acidization. It should be emphasized that what is said hereinafter as to the utility and effectiveness of the composition of matter herein contemplated applies with equal force and effect to the process which forms part of the present invention.

A number of problems have been involved in the introduction of strong mineral acid into oil-bearing strata of the kind containing calcium carbonate, magnesium carbonate, mixtures of same, siliceous material or material which is dolomitic in character, and commonly referred to as calcareous structures. One problem is the prevention of corrosion or damage to the metallic working parts of the well, into which the acid is introduced. This has been overcome in various ways, such as by the use of an inhibitor. For the sake of brevity, reference is made to the following patents, which give a cross-sectional view of the art relating to acidization, although there are in addition certain other practical elements which are well known: U. S. Patents Nos. 1,877,504, dated September 13, 1932, Grebe and Sanford; 1,891,667, dated December 20, 1932, Carr; 1,911,446, dated May 20, 1933, Grebe and Sanford; 1,990,969, dated February 12, 1935, Wilson; 2,011,579, dated August 20, 1935, Heath and Fry; 2,024,718, dated December 17, 1935, Chamberlain; 2,038,956, dated April 28, 1936, Parkhurst; 2,053,285, dated September 3, 1936, Grebe; 2,128,160 and 2,128,161, dated August 23, 1938, Morgan, and 2,161,085, dated June 6, 1939, Phalen.

As has been previously stated, in the acidization of oil-bearing calcareous strata or the like, it has been found necessary, in some instances, to add certain other materials or compounds which give additional desirable effects, at least under certain conditions. For instance, hydrofluoric acid or fluorides have been added to intensify the action of the hydrochloric acid used to treat the well. Possibly, this is related to the action on siliceous matter in the calcareous structure. The reason for the addition of inhibitors has been previously indicated. Sometimes it has been desirable to add tenacious foam-producing agents, such as glue, gelatin, or the like. In other instances it has been desirable to add calcium sequestering compounds, such as sodium hexametaphosphate. In other instances reducing agents have been added to keep any dissolved iron salts in the ferrous state. Isopropyl alcohol or the like is sometimes added as a surface tension depressant. Thus, the addition of various other auxiliary agents, commonly referred to as addition agents, is well known.

We have found that the materials or products which we contemplate adding to the hydrochloric acid or the like to produce one new composition of matter, or to act as an emulsion-preventing agent in our new process, do not interfere in any manner with the functional effect of other conventional acidizing addition agents. Of course, any single example may contain no addition agent at all; or it may contain one or more, depending upon the particular local conditions and use. As far as we are aware, the herein contemplated compounds which are added to hydrochloric acid or any other suitable mineral acid, such as a mixture of hydrochloric acid and hydrofluoric acid, do not replace other addition agents which have been added for various other purposes. For the sake of brevity, reference will be made to hydrochloric acid as illustrating any suitable mineral acid. It is understood, of course, that such hydrochloric acid may or may not contain various amounts of hydrofluoric acid.

As previously indicated, the emulsion-preventing agents herein described have the effect of preventing emulsions when an oil well is turned into production after the acidizing operation. Many oil wells are acidized without subsequently producing any emulsions; or the emulsions, if produced, are self-resolving or readily susceptible to any moderate breaking action. However, certain wells, particularly those located in western Kansas and certain wells in Illinois, when acidized by conventional process, yield particularly refractory emulsions. This is a rather surprising situation, insofar that the spent acid results in a solution having approximately 20% of calcium chloride present, and having a pH value of approximately 3.5 to 5. One would expect the increased acidity over that of most natural brines to decrease the stability of the emulsion. One would also expect that the increased electrolyte content of the dispersed phase would decrease the stability of the emulsion. The increased specific gravity differential should have a similar destabilizing effect. Actually, in a number of instances this is not the case, and such emulsions have resulted in unusual problems. In its broadest aspect, then, the agents herein contemplated may be used simply as emulsion preventers in connection with the acidization of subterranean strata.

The most concentrated hydrochloric acid, ordinarily available, is about 36% HCl strength. The commercial acid of this strength or somewhat weaker, is usually diluted with an equal quantity of water before it is used for acidization; i. e., the acid used in acidization may vary from 14% to 16.5% HCl, although acid varying in strength from 5% to 20% HCl has been employed. It is entirely feasible to add an agent to the acid as produced at the point of manufacture, thus exemplifying the composition of matter feature of the present invention. For instance, if desired, 0.02 to 5% of the contemplated agent may be added to the concentrated hydrochloric acid in manufacture. Such acid can be diluted to a suitable point before being employed in the acidization process. Thus, such concentrated acid can be diluted, for instance, half and half, so that the reagent is present in the dilute product within the ratio suggested previously, to wit, 0.01% to 2.5%. In many instances, the use of between 0.05% and 0.5% represents an acceptable average range.

In actual practice the hydrochloric acid obtained by a person or firm responsible for acidizing operations may be used in some instances on oil-bearing strata which do not form severe or refractory emulsions, and thus no advantage is obtained by adding a composition of the kind herein contemplated, in comparison with ordinary acid. Then too, some calcareous oil-bearing strata which produces severe emulsions, may require more or less of the agent of the kind herein contemplated than would be necessary in some other strata. For this reason, in the practical aspect it is generally desirable to add the agent of the kind herein contemplated to the dilute acid, so as to be suitable for the specific local conditions which require treatment. The suitable range of ratios for ordinary half-strength acid has been indicated.

As has been previously suggested, one may also add to the acid intended for acidization, various other reagents or addition products of the kind described in the aforementioned list of patents, without affecting the operation of the emulsion-prevening agent that we employ, and without danger of said emulsion-preventing agent interfering with the effectiveness of such other acidization addition products. Likewise, it has been indicated that one need not necessarily employ our emulsion-preventing agent in the form of an addition agent, which is added to or mixed with the acid used in the acidizing step. Instead, our emulsion-preventing agent may be introduced in suitable aqueous solution, preferably in fairly concentrated solution, for instance, 1-5%, prior to the acidizing step or immediately after the acidizing step. The method of introduction is, of course, any conventional method, and preferably, employs the same apparatus and procedure used for introducing the acid. For convenience, however, and in the most preferred form, our invention is exemplified by employing as an integral part thereof the composition of matter herein contemplated, to wit, hydrochloric acid or the like, containing, in stable admixture, agents of the kind subsequently to be described and without the percentage range indicated.

The ineffectiveness of most ordinary demulsifiers for preventing the formation of water-in-oil type emulsions resulting from acidization, is readily understandable. Ordinary demulsifiers either are not soluble in half-strength hydrochloric acid, or its equivalent, or they are not soluble in spent brine of the kind previously mentioned, i. e., brine containing roughly equivalent to 20% of calcium chloride and having a pH of 3.5 to 5. Furthermore, if soluble at all, they are generally decomposed; and if they do not decompose under ordinary conditions, they at least decompose under the conditions which involve the necessary pressure employed in acidization. Then, too, in some instances where such demulsifiers appear to meet all other requirements, they apparently precipitate out on the face of the pay sand or oil-bearing strata, and may even reduce instead of increase the oil production, as compared with results obtained by ordinary acid. There are a number of other reasons not necessary to explain, which prevent ordinary demulsifiers from being effective. It is possible that the characteristic properties of our new composition of matter herein described, make it adaptable for uses in other arts with which we are not acquainted; but it may be apparent to others. It is also possible that the stable admixture of the kind described, i. e., certain agents dissolved in strong mineral acid, have other properties which we have not investigated, and in view of such properties, such mixture is particularly adaptable for the particular use herein described.

All the chemical compounds previously described are water-soluble. For this reason they can be used without difficulty in aqueous solution as an emulsion-preventing agent by injecting such aqueous solution into the oil-bearing strata prior to acidization, or immediately after acidization. Such injection is made by conventional means, as, for example, the same apparatus or mechanical device employed for injecting the acid into the well or oil-bearing strata. Furthermore, substantially all the compounds above described are soluble in hydrochloric acid of a strength corresponding to approximately 15%. If, in any instance, any of the above compounds do not show solubility in approximately 15% hydrochloric acid, then, if they are to be used in admixture with hydrochloric acid as per our preferred procedure, they should be subjected to a further etherization treatment with an alkylene oxide, such as ethylene oxide, so as to increase their solubility in such hydrochloric acid solution. Furthermore, substantially all the compounds of the type indicated are soluble in concentrated hydrochloric acid. Commercial hydrochloric acid is ordinarily available in grades from approximately 18 Bé., corresponding to approximately 28% anhydrous acid, to 22 Bé., corresponding to approximately 35.2% anhydrous acid. Some commercial hydrochloric acid is available in a strength which approximates CP, or slightly less than 37% anhydrous acid.

Needless to say, the composition of matter can be prepared readily in any convenient manner. The selected compound may be dissolved in concentrated hydrochloric acid without dilution. The percentages employed have already been indicated. Such a concentrated hydrochloric acid may or may not contain some hydrofluoric acid. Likewise, if desired, the agent may be dissolved in water, and such aqueous solution added to the hydrochloric acid or the like in order to dilute the same to the desired concentration. Another procedure, of course, is to dilute the hydrochloric acid to the desired concentration and add the particular chemical compound which has been selected. The percentage of chemical compound of the kind herein described is added within the range of 0.01% to 5%.

Having thus described our invention, what we claim as new and desire to secure by Letters Patent is:

1. A process for preventing water-in-oil type emulsions resulting from acidization of calcareous oil-bearing strata, which consists in introducing into the cognate fluids of a well prior to emergence, a demulsifier comprising oxyalkylated imidazolines substituted in 2-position, by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11.

2. A process for preventing water-in-oil type emulsions resulting from acidization of calcareous oil-bearing strata, which consists in introducing into the cognate fluids of a well prior to emergence, a demulsifier comprising oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11; said radical substituted in the 2-position being derived from a higher fatty acid.

3. A process for preventing water-in-oil type emulsions resulting from acidization of calcareous oil-bearing strata, which consists in introducing into the cognate fluids of a well prior to emergence, a demulsifier comprising oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11; said radical substituted in the 2-position being derived from naphthenic acid.

4. A process for preventing water-in-oil type emulsions resulting from acidization of calcareous oil-bearing strata, which consists in introducing into the cognate fluids of a well prior to emergence, a demulsifier comprising oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11; said radical substituted in the 2-position being derived from abietic acid.

5. A new composition of matter, comprising a strong mineral acid and oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11.

6. A new composition of matter, comprising hydrochloric acid whose concentration is at least equal to approximately half strength commercial 18° Baumé acid, and oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11.

7. A new composition of matter, comprising hydrochloric acid whose concentration is at least equal to approximately half strength commercial 18° Baumé acid, and oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11; said radical substituted in the 2-position being derived from a higher fatty acid.

8. A new composition of matter, comprising hydrochloric acid whose concentration is at least equal to approximately half strength commercial 18° Baumé acid, and oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11; said radical substituted in the 2-position being derived from naphthenic acid.

9. A new composition of matter, comprising hydrochloric acid whose concentration is at least equal to approximately half strength commercial 18° Baumé acid, and oxyalkylated imidazolines substituted in 2-position by a radical containing from 11–22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical selected from the class consisting of —N—(R—O)$_n$H and —NH—(R—O)$_n$H wherein R denotes an aliphatic radical and $n$ is a whole number greater than 2 and less than 11; said radical substituted in the 2-position being derived from abietic acid.

MELVIN DE GROOTE.
BERNHARD KEISER.
CHARLES M. BLAIR, Jr.